US009832795B2

(12) United States Patent
Perez Martinez et al.

(10) Patent No.: US 9,832,795 B2
(45) Date of Patent: Nov. 28, 2017

(54) CLIENT INTERFACE SCRIPT BASED USER COMMUNICATION IN A MOBILE NETWORK

(75) Inventors: Alfonso de Jesus Perez Martinez, Madrid (ES); Rodrigo Alvarez Dominguez, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 289 days.

(21) Appl. No.: 14/235,211

(22) PCT Filed: Jul. 28, 2011

(86) PCT No.: PCT/EP2011/063007
§ 371 (c)(1),
(2), (4) Date: Mar. 20, 2014

(87) PCT Pub. No.: WO2013/013719
PCT Pub. Date: Jan. 31, 2013

(65) Prior Publication Data
US 2014/0192754 A1    Jul. 10, 2014

(51) Int. Cl.
*H04W 76/02* (2009.01)
*H04L 29/08* (2006.01)
(Continued)

(52) U.S. Cl.
CPC ............ *H04W 76/02* (2013.01); *H04L 67/02* (2013.01); *H04M 15/66* (2013.01); *H04W 88/16* (2013.01); *H04L 12/1407* (2013.01)

(58) Field of Classification Search
CPC ....... H04L 67/02; H04M 15/66; H04W 76/02; H04W 88/16
See application file for complete search history.

(56) References Cited

U.S. PATENT DOCUMENTS 8,578,499 B1 * 11/2013 Zhu ...................... G06F 21/567
                                                     713/154
2005/0135375 A1 * 6/2005 Hurtta ................. H04L 12/5692
                                                     370/395.2
(Continued)

FOREIGN PATENT DOCUMENTS

WO    WO 2010/049002 A1    5/2010

OTHER PUBLICATIONS

International Search Report, Application No. PCT/EP2011/063007, dated Oct. 28, 2011.
(Continued)

*Primary Examiner* — Noel Beharry
*Assistant Examiner* — Rodrick Mak
(74) *Attorney, Agent, or Firm* — Sage Patent Group

(57) ABSTRACT

In a mobile network comprising a gateway for establishing a packet data connection with a user equipment, user communication is implemented on the basis of a client interface script to be executed in a browser application of the user equipment. For this purpose, the gateway receives data destined to the browser application of the user equipment. The gateway modifies the received data to provide the user equipment with the client interface script, e.g., by including an identifier of the client interface script in to the data. The gateway sends the modified data to the user equipment, thereby enabling the browser application of the user equipment to execute the client interface script. Execution of the client interface script in the browser application may for example implement a user dialog for customizing functions of the mobile network.

23 Claims, 14 Drawing Sheets

(51) Int. Cl.
*H04M 15/00* (2006.01)
*H04W 88/16* (2009.01)
*H04L 12/14* (2006.01)

(56) References Cited

U.S. PATENT DOCUMENTS

| | | | |
|---|---|---|---|
| 2008/0147772 A1* | 6/2008 | Runne | H04L 67/306 709/201 |
| 2008/0195712 A1* | 8/2008 | Lin | G06F 3/0486 709/206 |
| 2009/0043849 A1* | 2/2009 | Blackburn | H04L 51/04 709/205 |
| 2009/0313124 A1* | 12/2009 | Miranda | G01C 21/3647 705/14.58 |
| 2010/0005410 A1* | 1/2010 | Pang | G06F 9/455 715/765 |
| 2011/0124319 A1* | 5/2011 | Fu | H04L 67/02 455/414.1 |
| 2011/0202635 A1* | 8/2011 | Yeung | H04L 12/1407 709/219 |
| 2011/0275344 A1* | 11/2011 | Momtahan | H04L 12/14 455/405 |
| 2011/0276442 A1* | 11/2011 | Momtahan | G06Q 30/00 705/30 |
| 2012/0151375 A1* | 6/2012 | Lin | G06F 17/30893 715/741 |
| 2012/0207021 A1* | 8/2012 | Rahman | H04L 41/0896 370/235 |
| 2013/0203036 A1* | 8/2013 | Jabara | H04L 67/10 434/350 |
| 2014/0129457 A1* | 5/2014 | Peeler | G06Q 30/018 705/317 |

OTHER PUBLICATIONS

Written Opinion of the International Searching Authority, Application No. PCT/EP2011/063007, dated Oct. 28, 2011.
3GPP, Technical Specification, "3rd Generation Partnership Project; Technical Specification Group Services and System Aspects; Policy and charging control architecture (Release 10)", 3GPP TS 23.203 V10.2.0 (Dec. 2010), 132 pp.
ETSI, Technical Specification, Universal Mobile Telecommunications System (UMTS); LTE; Policy and charging control over Gx reference point (3GPP TS 29.212 version 9.2.0 Release 9), ETSI TS 129 212 V9.2.0 (Apr. 2010), 114 pp.
International Preliminary Report on Patentability, Application No. PCT/EP2011/063007, dated Feb. 6, 2014.
Chinese First Office Action Corresponding to Chinese Application No. 201180072633.8; dated Jun. 2, 2016; English Translation, 11 pages.

* cited by examiner

```
<HTML>
<head>
<meta http-equiv="content-type" content="text/html; charset=UTF8"
<title>Example</title>
...
<body> ... </body>
</HTML>
```

FIG. 4

```
<HTML>
<head>
<meta http-equiv="content-type" content="text/html; charset=UTF8"
<script language="javascript" src=http://<SPR_URL>/<MSISDN>.jss> </script>
<title>Example</title>
...
<body onLoad="javascript:popUp('')">
...
</body>
</HTML>
```

FIG. 5

```
<HTML>
<head>
<meta http-equiv="content-type" content="text/html; charset=UTF8"
<script language="javascript" src=http://<SPR_URL>/<MSISDN>.jss> </script>
<title>Example</title>
...
<body>
<FORM>
<input type="button" value="Open your mobile profile" onclick=javascript:popup()">
</FORM>
...
</body>
</HTML>
```

FIG. 6

CLIENT INTERFACE SCRIPT BASED USER COMMUNICATION IN A MOBILE NETWORK

TECHNICAL FIELD

The present invention relates to methods for user communication in a mobile network and to corresponding devices.

BACKGROUND

Smart devices, e.g., laptops and smartphones, have created a new type of challenge to mobile networks because these devices may keep a more or less permanent data connection to the mobile network. This may for example lead to increased signaling in the network. Further, this may also lead to increased traffic volume in the mobile network. In addition, new features of smart devices have a tendency to increase the data traffic of mobile network users, e.g., through application downloads or video streaming. At the same time, end users are demanding a better end to end quality of experience (QoE). To address this demand for improved QoE, mobile networks provide mechanisms for controlling the Quality of Service (QoS) provided for data traffic related to certain services, e.g., Voice over Internet Protocol (VoIP) telephony or multimedia service.

In order to manage usage of network resources, mobile networks according to the $3^{rd}$ Generation Partnership Project (3GPP) are provided with a Policy and Charging Control (PCC) architecture, see, e.g., 3GPP Technical Specification (TS) 23.203. The PCC architecture allows the operators to achieve real-time control of their network resources, control subscriber access to services, and proactively optimize network capacity. Currently, an end user, i.e., a subscriber accessing the mobile network with a user equipment (UE), can customize some PCC functions. For example, this can be achieved by a call to a customer service center. However, other possibilities of interaction between the end user and the PCC architecture are limited.

Accordingly, there is a general need for techniques which provide possibilities of communication between a network node of the mobile network and an end user, e.g., for interactively configuring network functions such as the above-mentioned PCC functions.

SUMMARY

According to an embodiment of the invention, a method is provided. The method is to be performed in a mobile network comprising a gateway for establishing a packet data connection with a user equipment and may be implemented by the gateway. According to the method, the gateway receives data destined to a browser application of the user equipment. The gateway modifies the received data to provide the user equipment with a client interface script to be executed in the browser application of the user equipment. Further, the gateway sends the modified data to the user equipment, thereby enabling the browser application to execute the client interface script.

According to a further embodiment of the invention, a method is provided. The method is to be performed in a mobile network comprising a gateway for establishing a packet data connection with a user equipment and may be implemented by a policy controller of the mobile network. According to this method, the policy controller receives, from the gateway, an indication of data communicated with a browser application of the user equipment. Further, the policy controller determines a client interface script to be executed in the browser application of the user equipment and sends an identifier of the client interface script to the gateway.

According to a further embodiment of the invention, a gateway is provided. The gateway is for use in a mobile network for establishing a packet data connection with a user equipment. The gateway comprises a first interface with respect to a web server, a second interface with respect to the user equipment, and a processor. The processor is configured to:

receive, via the first interface, data destined to a browser application of the user equipment, modify the received data to provide the user equipment with a client interface script to be executed in the browser application to the user equipment, and send, via the second interface, the modified data to the user equipment, thereby enabling the browser application of the user equipment to execute the client interface script.

According to a further embodiment of the invention, a policy controller is provided. The policy controller is for use in a mobile network comprising a gateway for establishing a packet data connection with a user equipment. For example, the policy controller may have the purpose of controlling the gateway. The policy controller comprises a control interface with respect to the gateway and a processor. The processor is configured to:

receive, via the control interface, an indication of data communicated with a browser application of the user equipment, and determine a client interface script to be included in said data and to be executed in the browser application to the user equipment.

According to further embodiments, other methods, devices, or computer program products for implementing the methods may be provided.

BRIEF DESCRIPTION OF THE DRAWINGS

FIG. 4 shows an example of data destined to a browser application.

FIG. 5 shows the data of FIG. 4 as modified in an exemplary process according to an embodiment of the invention.

FIG. 6 shows the data of FIG. 4 as modified in a further exemplary process according to an embodiment of the invention.

DETAILED DESCRIPTION OF EMBODIMENTS

In the following, the invention will be explained in more detail by referring to exemplary embodiments and to the accompanying drawings. The illustrated embodiments relate to concepts of user communication in a mobile network. In particular, the concepts may be used to provide a user with ways to interact with control nodes in the mobile network. In the following, the concepts will be explained in the context of a mobile network according to 3GPP TSs. However, it is to be understood that the illustrated concepts may be applied in other types of mobile network as well.

Figure 1:
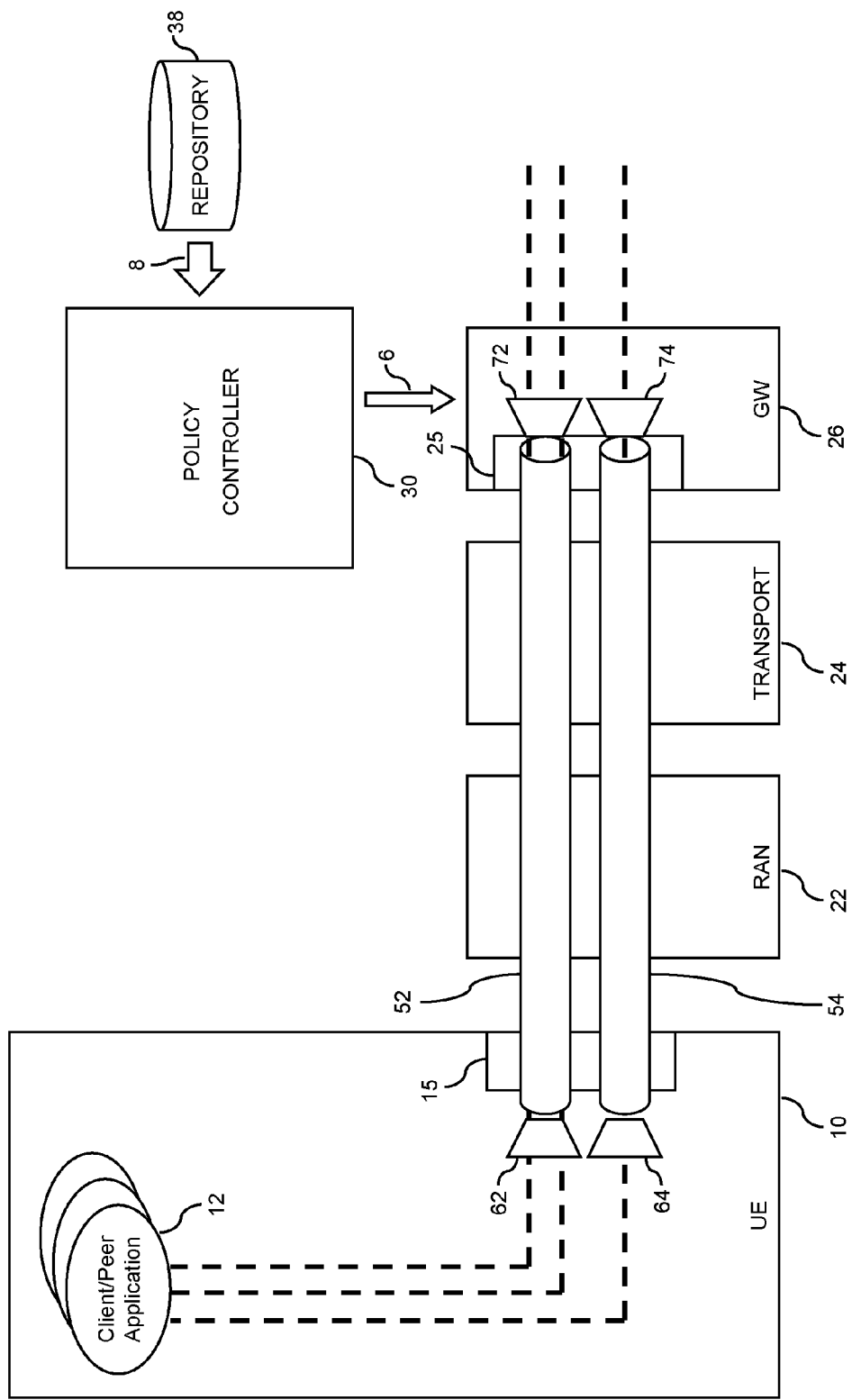
FIG. 1 schematically illustrates a mobile network environment in which concepts according to embodiments of the invention can be applied.

FIG. 1 schematically illustrates a mobile network environment in which concepts according to embodiments of the invention can be applied.

The mobile network environment includes a UE 10, e.g., a mobile terminal, and a number of network components 22, 24, 26, 30. Among these network components there is a Radio Access Network (RAN) 22. The RAN is based on a certain type or certain types of radio access technology, e.g. GSM (Global System for Mobile Communications), EDGE (Enhanced Data Rate for GSM Evolution), UMTS (Universal Mobile Telecommunications System), HSPA (High Speed Packet Access), LTE (Long Term Evolution), or LTE-Advanced. Although the RAN 22 is illustrated as a single node, it is to be understood that the RAN 22 may actually be formed of a number of components, which are not further explained herein. The RAN 22 is coupled to a transport node 24, which in turn is coupled to a gateway (GW) 26. Here, it is to be understood that alternatively more than one transport node 24 may be coupled between the RAN 22 and the gateway 26 or that the RAN 22 may be directly coupled to the gateway 26. The gateway 26 may be a Gateway GPRS Support Node (GGSN) providing a connection of GPRS-based services to one or more external packet data networks. The gateway 26 may also be a System Architecture Evolution Gateway (SAE GW) according to the 3GPP TSs.

In addition, the mobile communication network includes a policy controller 30, which is implemented as a Policy and Charging Rules Function (PCRF) according to the 3GPP TSs. The policy controller 30 may be implemented by dedicated hardware and/or comprise software functions executed by a processor. The gateway 26 and the policy controller 30 are typically regarded as components of a core network. The policy controller 30 communicates with the gateway 26 via a signaling path 6, which may be implemented using the Gx reference point according to the 3GPP TSs. The policy controller 30 may be further coupled to a repository 38 via a signaling path 8, e.g., implemented using the Sp reference point according to the 3GPP TSs. The repository 38 may store user related subscription data, e.g., arranged in the form of subscriber profiles and service policies.

As further illustrated, data traffic between the network and the user equipment 10 can be carried by a number of bearers 52, 54. The data traffic typically pertains to one or more client/peer applications 12 running on the UE 10, e.g., may relate to certain services. The client/peer applications 12 include at least a browser application configured to provide a user of the UE 10 with access to resources in the internet, e.g., to webpages.

The bearers 52, 54 are established between the user equipment 10 and the gateway 26. The bearers 52, 54 carry data traffic in both the DL and the UL direction, i.e., may also be regarded as being formed of a DL bearer and a UL bearer. For supporting bidirectional communication on the bearers 52, 54, the UE 10 is provided with a corresponding interface 15 which allows for receiving incoming data packets from the bearers 52, 54 and sending outgoing data packets on the bearers 52, 54. Similarly, the gateway 26 is provided with a corresponding interface 25 which allows for receiving incoming data packets from the bearers 52, 54 and sending outgoing data packets on the bearers 52, 54.

The bearers 52, 54 may include a default bearer 52 generally established for offering packet-based services to the user equipment 10 and, optionally, one or more dedicated bearer 54 which may have different QoS level, e.g., a higher or lower QoS level, than the default bearer. The default bearer 52 is typically established when the UE 10 attaches to the gateway 26. The dedicated bearer may be established on demand, e.g., when data packets of selected data traffic requiring a certain QoS level need to be transmitted.

Each bearer 52, 54 may be associated with a corresponding QoS profile. The QoS profile may be defined through QoS parameters such as a QoS Class Identifier (QCI), an Allocation/Retention Priority (ARP), a Traffic Handling Priority (THP), a Maximum Bit Rate (MBR), an Aggregate Maximum Bit Rate (AMBR), and/or a Guaranteed Bit Rate (GBR). Accordingly, a certain QoS level may be provided for communicating data packets between the UE 10 and the gateway 26 by directing the data packets to a corresponding bearer.

In the UE 10, the data packets are directed to a desired bearer 52, 54 using correspondingly configured UL packet filters 62, 64. In the gateway 26, the data packets are directed to the desired bearers 52, 54 using correspondingly configured DL packet filters 72, 74. Parameters of the QoS profile may be signaled from the policy controller 30 to the gateway 26 using the signaling path 6. Similarly, the DL packet filters 72, 74 to be used in the gateway 26 may be signaled from the policy controller 30 to the gateway 26 using the signaling path 6. As regards the UL packet filters 62, 64 used in the UE 10, these may be signaled from the policy controller 30 via the gateway 26 to the UE 10.

In the following, concepts according to embodiments of the invention will be explained, which provide a way of communication between one or more nodes in the mobile network and an end user of the UE 10. In particular, these concepts may be applied to provide the end user with a mechanism to interact with a control node in the mobile network, e.g., to modify policy control parameters or traffic handling rules as applied by the policy controller 30, in the following also referred to as PCC rules. These concepts are based on modifying data destined to the browser application running on the UE 10 to provide the UE 10 with a client interface script (CIS) to be executed in the browser application. More specifically, the gateway 26 may receive the data destined to the browser application, modify the received data, and send the modified data to the UE 10, thereby enabling the browser application of the UE 10 to execute the CIS. Here, it should be noted that the modified data may include the CIS itself or may include an identifier of the CIS, which is then used by the browser application to obtain the CIS. In some scenarios, execution of the CIS in the browser application may provide information to the user, e.g., concerning a service agreement of the user with an operator of the mobile network. For example, the user could be informed of changed bandwidths or tariffs. In some scenarios, execution of the CIS in the browser application may be used for implementing a user dialogue, i.e., for providing information from a node of the mobile network to the user and vice versa. For example, the user could be informed of an option concerning a service agreement of the user with the operator of the mobile network, and the user could then select this option or not. The CIS could then return the information concerning the selection to the mobile network. For example, the user could select an option of increased bandwidth for packet data connections, an option of increased QoS for certain types of data, an option of blocking certain types of data, e.g., to implement parental control, or the like. The CIS may be implemented by any suitable client-side language, e.g., JavaScript or AJAX (Asynchronous JavaScript and XML) programming, that can be executed by the browser application.

The concepts may be used to allow the user to customize various types of PCC rules or parameters thereof, such as: traffic bandwidth for specific files, services, applications; a time schedule to apply this bandwidth; new tariffs to be applied or fees for specific files; enabling or disabling services or applications; and/or parental control. By means of the CIS, the user may indicate at any moment how to customize the PCC rules to the mobile network. On the other hand, the mobile network controls the CIS and its provision to the UE 10, and the mobile network can be modify the CIS at any suitable moment for PCRF, e.g., to include new options for selection by the user.

Figure 2:
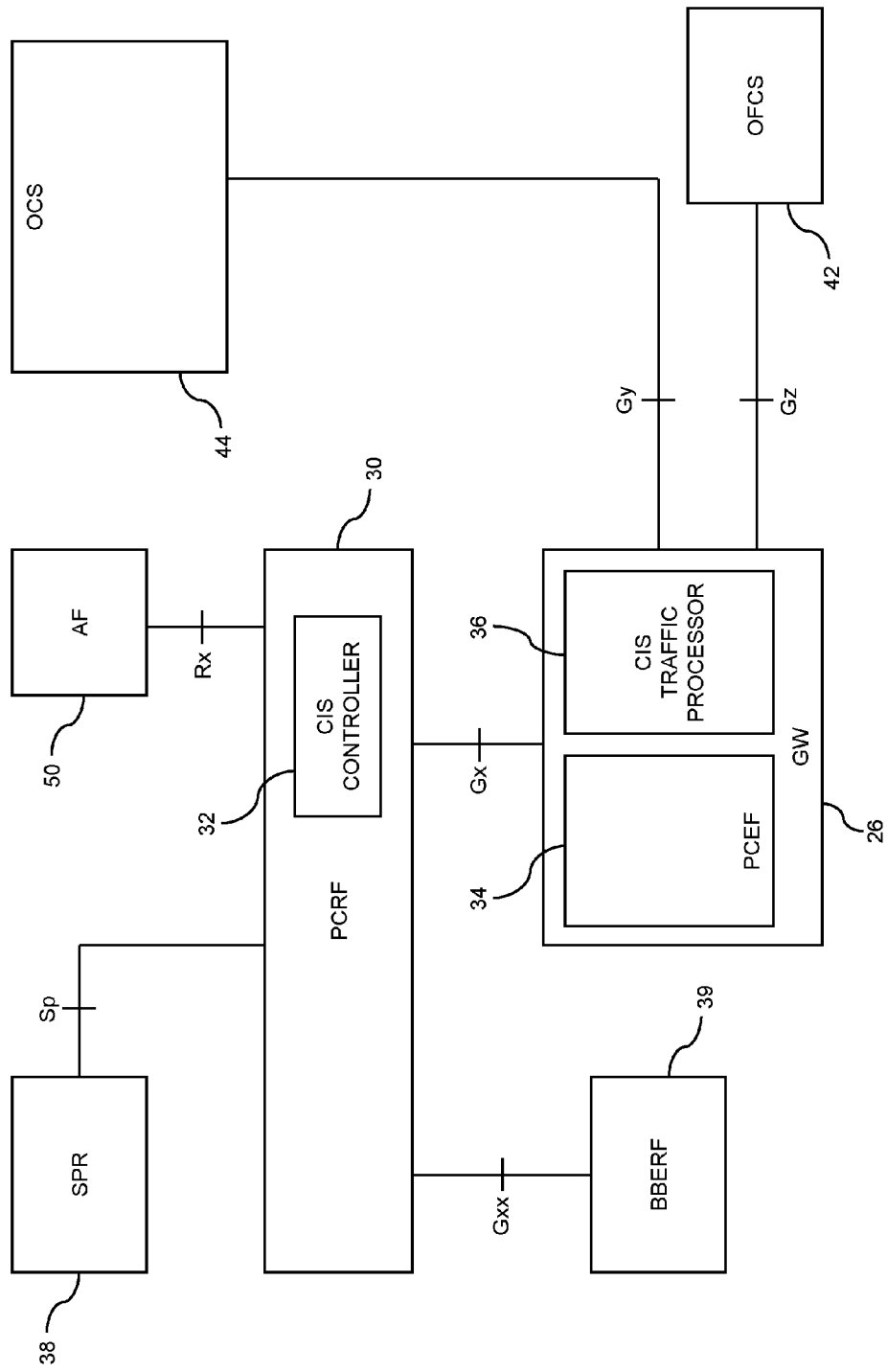
FIG. 2 schematically illustrates a PCC architecture according to an embodiment of the invention.

FIG. 2 further illustrates implementation of concepts according to an embodiment of the invention in a PCC architecture according to the 3GPP TSs. As illustrated, the PCC architecture includes a gateway (GW) 26, a policy controller in the form of a PCRF 30, and a repository 38. These components may correspond to the gateway 26, the policy controller 30, and the repository 38 as explained in connection with FIG. 1. In the illustrated embodiment, the PCRF 30 is implemented with a CIS controller 32. Further, the PCC architecture also includes a Policy Control Enforcement Function (PCEF) 34 and a CIS traffic processor 36 which are implemented in the gateway 26. In the illustrated example, the repository 38 corresponds to a Subscriber Profile Repository (SPR). However, it is to be understood that other types of repository could be used as well, e.g., a User Data Repository (UDR). As illustrated, the PCC architecture may also include a Bearer Binding and Event Reporting Function (BBERF) 39, an Offline Charging System (OFCS) 42, an Online Charging System (OCS) 44, and/or an Application Function (AF) 50.

The PCRF 30 is configured to perform policy control decision and flow based charging control. The PCRF 30 provides network control regarding detection of service data flows detection, gating, QoS, and flow based charging towards the PCEF 34. For this purpose, the PCRF 30 may signal PCC rules to the PCEF 34. The PCEF 34 may be configured to perform service data flow detection, policy enforcement and flow based charging functionalities, which is typically accomplished by applying the PCC rules as signaled by the PCRF 30. Further, the PCEF 34 may also implement functionalities of packet inspection, such as Deep Packet Inspection (DPI), and service classification. In this way data packets may be classified according to PCC rules defined in the PCEF 34 and be assigned to a certain service.

As further illustrated in FIG. 2, the nodes of the PCC architecture are coupled to each other by interfaces or reference points termed as Gx, Gxx, Gy, Gz, Sp, and Rx. The Gx reference point resides between the PCRF 30 and the gateway 26, and allows for communication between the PCRF 30 and the PCEF 34 or CIS traffic processor 36 in the gateway 26. The Gxx reference point resides between the PCRF 30 and the BBERF 39. The Gy reference point resides between the gateway 26 and the OCS 44. The Gz reference point resides between the gateway 26 and the OFCS 42. The Rx reference point resides between the AF 50 and the PCRF 30. The Sp reference point resides between the repository 38 and the PCRF. The Details concerning the implementation of these interfaces can be found in the 3GPP TSs, e.g, 3GPP TS 23.203 and 3GPP TS 29.212. It should be noted that different interfaces could be used in other implementations.

The implementation of concepts according to an embodiment of the invention as explained in the following involves the PCRF 30 with the CIS controller 32, the gateway 26, in particular the PCEF 34 and the CIS traffic processor 36 implemented in the gateway 26, and the repository 38. Further, also the end user, i.e., the subscriber using the UE 10 for establishing a packet data connection to the gateway 26, and the OCS 44 may be involved.

In some embodiments of the invention as explained in the following, the repository 38 further includes a CIS repository. This CIS repository may store CISs to customize the PCC rules. These CISs can be personalized for every user or there may be one specific CIS for each subscriber profile.

In the illustrated implementation, the PCEF 34 may be responsible for enforcing policies with respect to authentication of subscribers, authorization to access and services, and accounting and mobility. The PCRF 30 may be responsible for managing individual policies defining network, application, and subscriber conditions that must be met in order to successfully deliver a service or maintain the QoS of a given service. The repository 38, which may be a standalone database or integrated into an existing subscriber database such as a Home Subscriber Server (HSS), may include information such as entitlements, rate plans, etc. The repository 38 may provide subscription data such as a subscriber's allowed services, a pre-emption priority for each allowed service, information on a subscriber's QoS parameters, e.g., a subscribed guaranteed bandwidth QoS, a subscriber's charging related information, e.g., location information relevant for charging, a subscriber category, e.g., whether the subscriber is a gold user to be provided with a high QoS or a silver or bronze user to be provided with lower QoS.

In embodiments as explained in the following, the CIS is used to customize PCC rules to be applied by the PCEF 34. The CIS contains the interface logic that allows for customizing the PCC rules. However, it is to be understood that the CIS could alternatively or in addition be used for other types of customization of network functions or user communication. Also, the embodiments as explained in the following assume that the CIS is implemented using JavaScript. Using JavaScript has the benefit that it is supported in widely varying environments and most browser applications. Here, it is to be understood that other suitable languages could be used as well for implementing the CIS, e.g., AJAX programming. In some embodiments, if support of JavaScript or other language used for implementing the CIS is disabled in the browser application, a message may indicate to the end user how to enable this support and customization on the basis of the CIS.

In the illustrated embodiments, the end user does not need any specific action from PCEF 34 to customize the PCC rules because the CIS is executed in the browser application of the UE 10. No dedicated client/service architecture is needed for interaction between the end user and the mobile network. The CIS may send information concerning customization options selected by the end user to the mobile network, and a node in the mobile network may collect this information to modify the PCC functions. The CIS can be sent to the browser application of the UE 10 every time when the end user downloads a webpage. Sending of the CIS may also be triggered by only some specifically selected webpages.

In the illustrated embodiments, data destined to the browser application of the UE 10 are modified to provide the CIS to the UE 10. For example, data related to a webpage accessed by the browser application may be modified in order to insert the CIS in the data traffic associated with the webpage. In the implementation of FIG. 2, this is accomplished by the CIS traffic processor 36. Here, it should be noted that the modification of the data could also be accomplished by the PCEF 34 itself. However, by implementing the CIS traffic processor separately from the PCEF 34, altering of the end user traffic by the PCEF 34 is avoided. Selection of the appropriate CIS and modification of PCC rules on the basis of information obtained by the CIS is accomplished by the CIS controller 32 in the PCRF 30.

Figure 3:
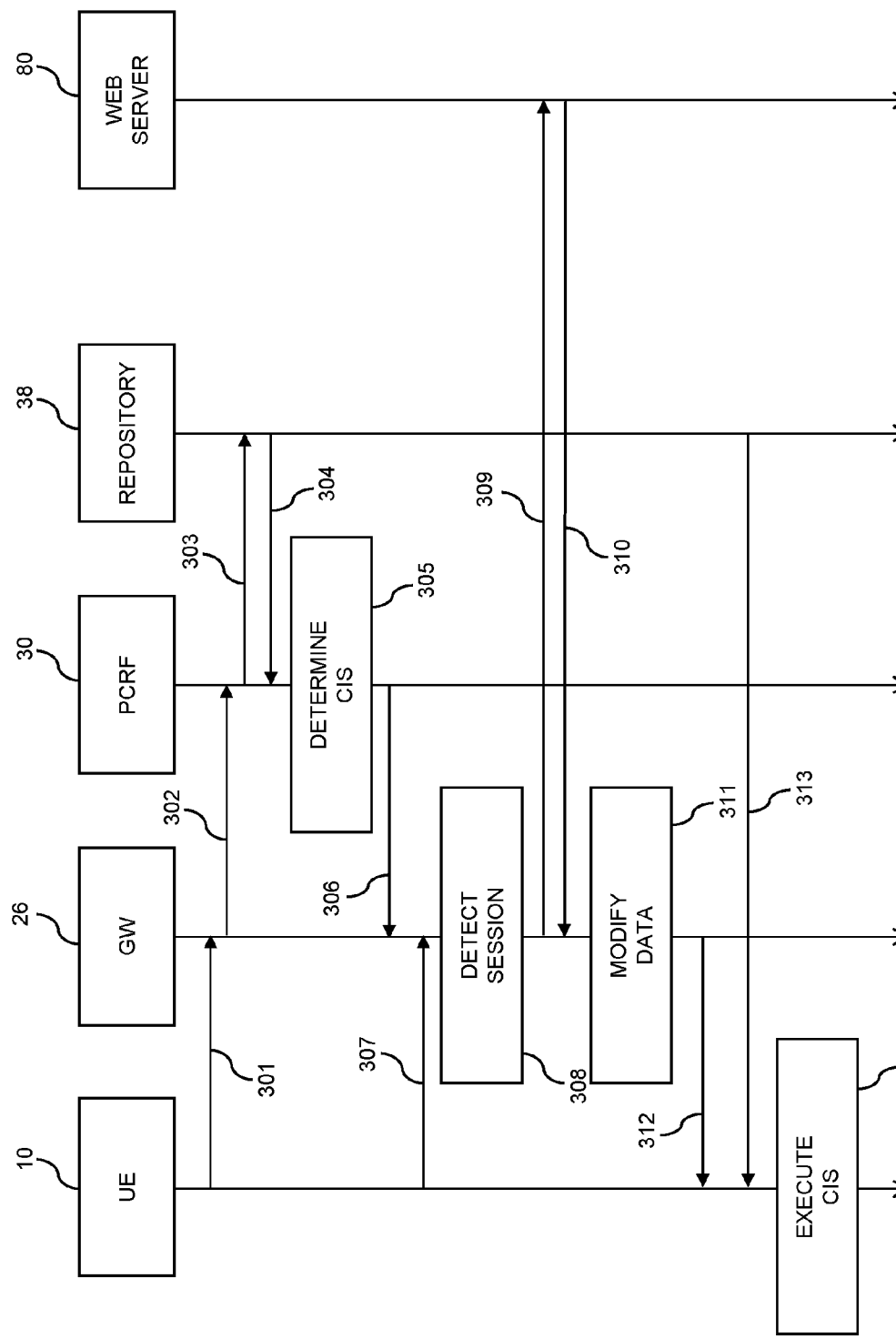
FIG. 3 shows a signaling diagram for illustrating a process according to an embodiment of the invention.

FIG. 3 shows a signaling diagram for illustrating an exemplary process of providing the CIS to a UE 10. A PCC architecture as explained in connection with FIG. 2 is assumed, and the process involves the UE 10, the gateway (GW) 26, the PCRF 30, the repository 38, and a web server 80.

In the process of FIG. 3, the UE 10 initially connects to a core packet network of the mobile network. This is accomplished by sending a message 301 from the UE 10 to the gateway 26. In response to receiving the message 301, the PCEF 34 of the gateway 26 establishes a first IP Connectivity Access Network (IP-CAN) session or modifies an existing IP-CAN session.

The PCEF 34 of the gateway 26 then sends to the PCRF 30 an initial Credit Control Request (CCR) message 302. In the CCR message 302, a Request-Type Attribute Value Pair (AVP) may be set to INITIAL_REQUEST. If so-called Gx+ extensions are enabled for the user session, a capability negotiation may then take place between the PCEF 34 and the PCRF 30 to determine proprietary features to be applied. In such a capability negotiation, an indication could be included that the gateway 26 is to be provided with the CIS for customizing PCC rules. This indication could be in the form of a Gx+ extension. The negotiation may also involve exchanging messages 303, 304 with the repository 38, e.g., for determining a CIS as indicated by step 305.

Determination of the CIS in step 305 may be accomplished on the basis of subscriber data from the repository 38. For example, the repository 38 could include an identifier location in which the CIS to be used for a certain subscriber is stored, e.g., in the form of a URL. The repository 38 could also include other information which may be used for individualizing a more generic CIS. In principle, all types of subscriber data in the repository 38 may be used for determining a CIS which is suitable for a certain end user.

The PCRF 30 then returns a Credit-Control-Answer (CCA) message 306 to the gateway 26. Depending on the negotiated capabilities, the CCA message 306 includes some form of policy control decision, e.g., which determine user access rights to one or more services. According to the illustrated embodiment, the CCA message 306 may indicate that the end user of the UE 10 has access to the service of customization of PCC rules and also the location of the CIS. For example, the location of the CIS may be indicated in the form of a Uniform Resource Locator (ULR).

When the end user of the UE 10 starts browsing a web page, the browser application of the UE 10 sends a HTTP GET request 307. The HTTP GET request 307 is directed to the web server 80, but is initially received by the gateway 26. The PCEF 34 in the gateway 26 detects the HTTP GET request 307, as indicated by step 308, and forwards it in message 309 to the web server 80. For detecting the HTTP GET request 307, the PCEF 34 in the gateway may for example use DPI or other packet inspection functionalities. The CIS traffic processor 36 in the gateway 26 receives the response message 309 from the web server 80, e.g., a HTTP 200 OK message. The response message 309 includes data destined to the browser application of the UE 10.

As indicated by step 311, the CIS traffic processor 36 in the gateway 26 then modifies the data received from the web server 80. In particular, the CIS traffic processor 36 includes the location of the CIS into the data, i.e., in the form of the URL as received in message 306.

The CIS traffic processor 36 in the gateway 26 then sends a message 312 including the modified data to the UE 10. In the UE 10, the modified data are processed by the browser application. Due to the modification in the data, the browser application causes the UE 10 to obtain the CIS from the indicated location, as indicated by message 313. In the illustrated example, the CIS is obtained from the repository 38. The obtained CIS is then executed in the browser application of the UE 10.

In the UE 10, the CIS may be used to show the end user different options to configure PCC rules. As will be further explained below, this may be accomplished in a separate browser application window, with no alteration of the requested webpage, or in the same browser application window as the requested webpage, which may be accomplished with small alterations of the requested webpage. The end user of the UE 10 may select one or more options presented by the CIS. The selection of an option may for example be used to select the bandwidth to be applied for future traffic related to the requested webpage or to traffic related to a certain URL or HyperText Transfer Protocol (HTTP) service. Also, the selection of one or more options could be used to determine a certain time for applying the selected bandwidth. Further, the selection of one or more options could be used to select a tariff to be applied or to configure PCC rules related to parental control, a time schedule for application of different bandwidths, handling of newly available services, application of new commercial packages, etc.

In the above process, the data destined to the browser application typically include HyperText Markup Language (HTML) code. An example of such HTML code is illustrated in FIG. 4. The exemplary HTML code of FIG. 4 corresponds to a web page entitled "Example". An example of a modification of the HTML code of FIG. 5 as accomplished in step 311 of the process of FIG. 3 is illustrated in FIG. 5. In FIG. 5, modified parts of the HTML code are illustrated in bold characters. The location of the CIS is indicated by the string "src=http://<SPR_URL>/<MSISDN>.jss".

In the example of FIG. 5, the modified HTML code uses the "popup" function of JavaScript, which opens a new browser window for the CIS. In the browser window, the end user could select one or more options, and information concerning this selection could be sent to a web server in the mobile network. When using the "popup" function, the browser window would be independent from the original webpage requested by the end user.

Another example of a modification is illustrated in FIG. 6. Again, the modified parts of the HTML code are illustrated in bold characters, and the location of the CIS is indicated by the string "src=http://<SPR_URL>/<MSISDN>.jss". In the example of FIG. 6, the modified HTML code is configured to launch a popup, referred to as a "form", in the same browser window as the requested webpage. For this purpose, AJAX programming of the CIS may be used.

In the example of FIG. 6, the end user may select one or more options and submit the form and/or close the popup. Since the CIS is executed in the same browser window as the requested web page, the information concerning the selection by the user would typically be sent to the web server hosting the webpage. In such an implementation, the PCEF 34 in the gateway 26 could detect the corresponding message to the web server, and the CIS traffic processor 36 could extract the information concerning the selection from the message. The CIS traffic processor 36 in the gateway could then remove the message from the traffic to the web server.

Figure 7:
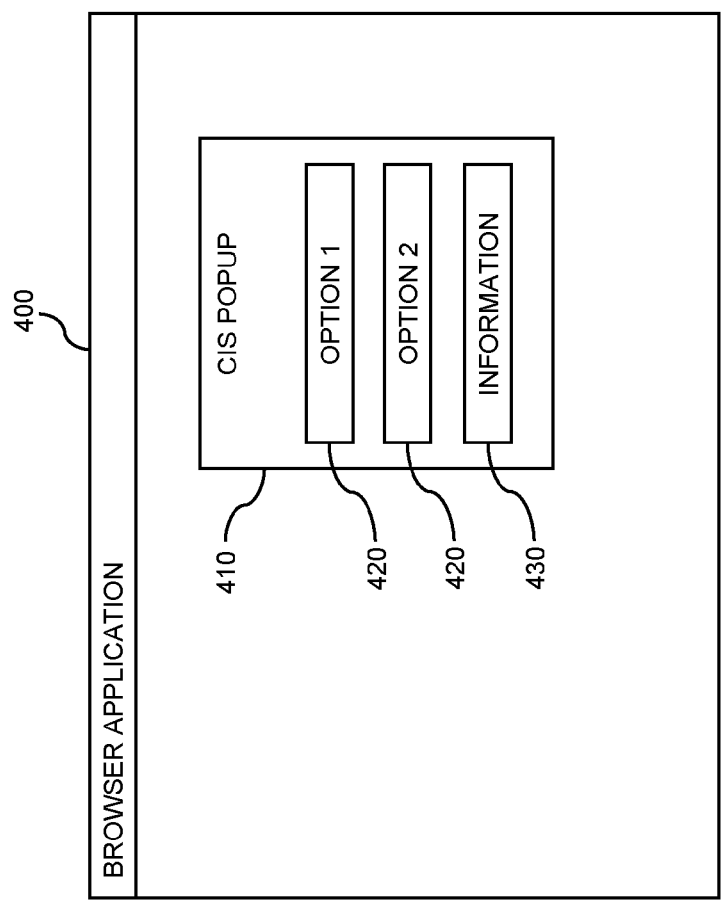
FIG. 7 schematically illustrates an example of a client interface as generated by a CIS in a process according to an embodiment of the invention.

FIG. 7 schematically illustrates a client interface as generated in an embodiment of the invention. More specifically, FIG. 7 illustrates a browser application display as presented to the end user of the UE 10. The browser application display includes a browser application window 400, and a CIS popup 410. The browser application window 400 may be one of a plurality of browser application windows generated by the browser application. The browser application window may be displayed in only a part of a full display area of the UE 10, e.g., together with other windows, or may cover the full display area. Also, in some scenarios other windows may overlap the browser application window 400. The browser application window 400 may for example be used to display the webpage associated with the exemplary HTML code of FIGS. 4 to 6.

As further illustrated, the browser application display also includes a CIS popup 410. In the illustrated example, the CIS popup 410 includes options 420 for selection by the end user and information 430 to the end user. The number of the options 420 may be selected as appropriate. Also, in some scenarios either the options 420 or the information 430 could be omitted. As explained above, code controlling the CIS popup 410 may be inserted the HTML code of a webpage.

If the browser application generates a new browser window for the CIS, as in the example of FIG. 5, the CIS popup 410 would be a browser window which is separate from the browser window 400. If the browser application used a popup in the same browser window for the CIS, as in the example of FIG. 6, the CIS popup 410 would be a popup within the browser window 400.

The CIS popup 410 may be opened at any moment from the webpage that the end user is viewing, e.g., by clicking in a button or a link. In order to avoid undesired opening of the CIS popup 410, the data destined to the browser application of the UE 10 could also be modified by the CIS traffic processor to install cookies in the browser application. Information from the cookies could be used to track what options were selected or rejected in the past or when the CIS was launched in the past. This may also be used to offer discounts or commercial offers according to previously selected options without using any database where saving these previous selections. For example, the end user could be offered to get a first video for free but pay for the second one.

The operator of the mobile network may determine when to provide the CIS to the UE 10. For example, data related to all webpages requested by the browser application of the UE 10 could be modified to provide the CIS to the UE 10. Alternatively, the CIS could be provided to the UE 10 only when a new service is detected. For example, if the PCEF 34 in the gateway 26 detects that a service such as Facebook, Twitter, a mobile game, a mobile gambling application is used for the first time by the UE 10, the CIS could be provided to the UE 10. Also, if a non-HTTP service is detected, such as Skype, instant messaging or mobile television, the CIS may be provided to the UE 10 when the browser application accesses the next webpage.

The CIS may open a HyperText Transfer Protocol (HTTP) connection to send the information concerning the selection by the end user to the mobile network. For example, this may be accomplished using the HTTP POST or the HTTP GET method. Sending of the information is asynchronous and may be accomplished in parallel to the HTTP connection used for the requested webpage.

It should be noted that the modification of the data by the CIS traffic processor 36 may also include modification of Transport Control Protocol (TCP) sequence numbers. In particular, TCP sequence numbers in the modified traffic to the UE 10 may be replaced to take into account that the data as modified in step 311 of FIG. 3 needs a longer message 309 than the original message 310 from the web server 80. Also, TCP sequence numbers in the traffic from the UE 10 to the web server 80 may be replaced according to what the web server 80 expects, i.e., with TCP sequence numbers as used without modification of the data at step 311.

Figure 8:
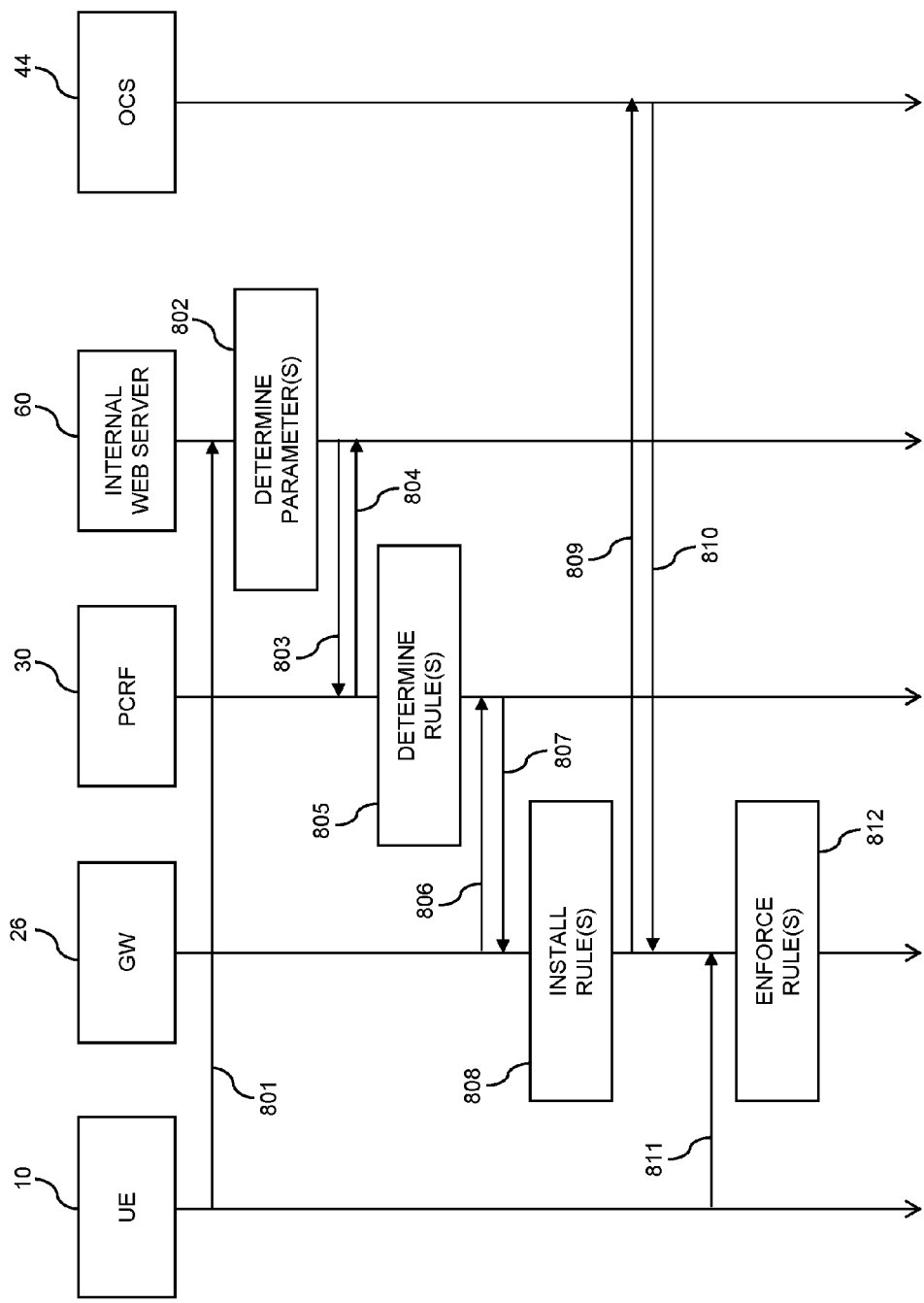
FIG. 8 shows a signaling diagram for illustrating a further process according to an embodiment of the invention.

FIG. 8 shows a signaling diagram for illustrating an exemplary process of sending information obtained by the CIS from the UE 10 to the mobile network. A PCC architecture as explained in connection with FIG. 2 is assumed, and the process involves the UE 10, the gateway (GW) 26, the PCRF 30, an internal web server 60, and the OCS 44. The internal web server may be implemented in any node of the mobile network which has a connection to the PCRF 30. For example, the internal web server 60 could be implemented in the same node as the repository 38. The internal web server 60 has the purpose of collecting the information obtained by the CIS. The process of FIG. 8 may be performed when the end user has selected one or more options in the CIS. For example, the process of FIG. 8 may follow the process of FIG. 3.

In the process of FIG. 8, the CIS opens a HTTP connection with the internal web server 60, which is accomplished by sending a message 801. For this purpose, the HTTP GET method or the HTTP POST method may be used. The information concerning the selection by the end user may be HTTP parameters of this HTTP connection. For example, such parameters could be expressed as "bandwidth=5000, time=30, URL=service=http://www.example.com?q=YF32FF" to indicate that a bandwidth of 5000 Mbs should be applied for the next 30 min and for HTTP traffic related to the URL www.example.com?q=YF32FF.

As indicated by step 802, the internal web server 60 determines parameters from the message 801, e.g. a selected bandwith, a selected time, a selected URL, or the like. The internal web server 60 then communicates the parameters to the PCRF 30. This may be accomplished by sending a CCR message 803 to the PCRF 30 and receiving a CCA message 804 from the PCRF 30.

At step 805 the PCRF 30 determines new or updated PCC rules on the basis of the parameters received from the internal web server 60. This determination may also take into account subscriber data or service policies as stored in the repository 38.

The PCRF 30 then sends the determined PCC rules to the gateway 26, where they are to be applied by the PCEF 34. This may be accomplished by receiving a CCR message 806 from the gateway 26 and sending a CCA message 807 with the PCC rules to the gateway 26.

As indicated by step 806, the PCC rules are installed in the PCEF 34 of the gateway 26 and will be applied to future traffic from or to the UE 10. For example, the bandwidth for a download could be increased or certain types of traffic, such as mobile gaming, could be blocked as selected by the end user.

Since other fees may be associated with the newly installed PCC rules, the PCEF 34 of the gateway 26 may inform the OCS 44 accordingly. This may be accomplished by sending a CCR message 809 to the OCS 44 and receiving a CCA message from the OCS 44.

As illustrated with exemplary message 811 and indicated by step 812, the newly installed PCC rules are then enforced on the data traffic from or to the UE 10. For example, if the newly installed PCC rules include blocking of traffic related to mobile gaming and the message 811 is a request related to mobile gaming, enforcing the FCC rules causes the message 811 to be blocked by the PCEF 34 of the gateway 26.

Figure 9:
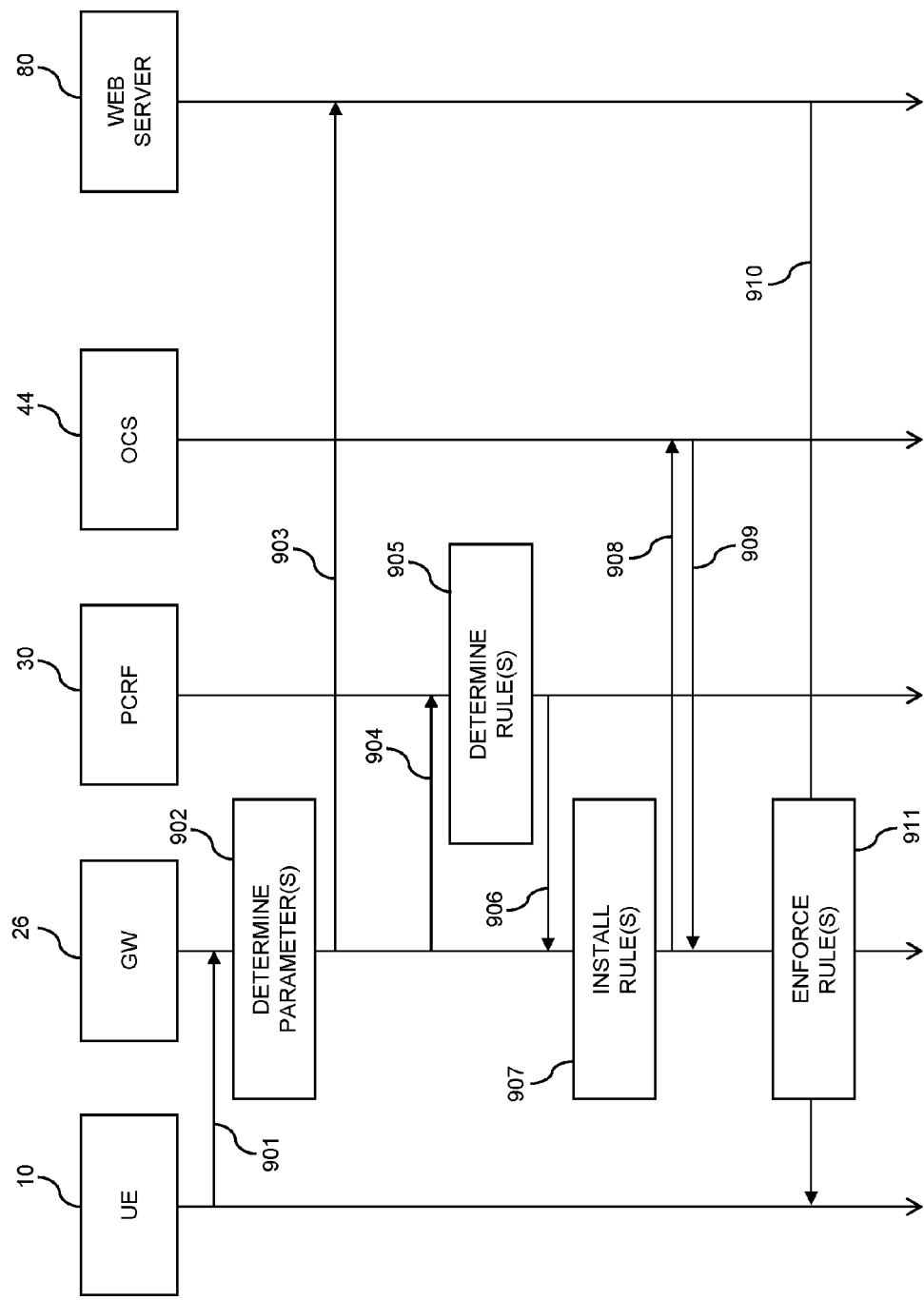
FIG. 9 shows a signaling diagram for illustrating a still further process according to an embodiment of the invention.

FIG. 9 shows a signaling diagram for illustrating a further exemplary process of sending information obtained by the CIS from the UE 10 to the mobile network. A PCC architecture as explained in connection with FIG. 2 is assumed, and the process involves the UE 10, the gateway (GW) 26, the PCRF 30, the OCS 44, and a web server 80. The process of FIG. 9 may be performed when the end user has selected one or more options in the CIS. For example, the process of FIG. 9 may follow the process of FIG. 3. As compared to the process of FIG. 8, no internal web server is needed in the process of FIG. 9. Rather, the CIS traffic processor 36 in the gateway 26 may collect the information obtained by the CIS. For this purpose, the CIS traffic processor 36 may intercept a traffic from the UE 10 to the web server 80 and extract the information from the intercepted traffic. Further, the CIS traffic processor 26 may remove the extracted information from the traffic to the web server 80. For this purpose, the CIS traffic processor 36 in the gateway 26 may act, toward the UE 10, as a replacement of the web server 80. For example, the CIS traffic processor 26 could act as a HTTP proxy. In the process of FIG. 9, the gateway 26 itself could generate new PCC rules on the basis of the extracted information. Alternatively or in addition, the gateway 26 could send the extracted information to the PCRF 30 for generation of new PCC rules.

In the process of FIG. 9, the CIS opens a HTTP connection with the web server 80, which is accomplished by sending a message 901. As in the process of FIG. 8, the HTTP GET method or the HTTP POST method may be used for this purpose. The information concerning the selection by the end user may be HTTP parameters of this HTTP connection. For example, as in the process of FIG. 8, such parameters could be expressed as "bandwidth=5000, time=30, URL=service=http://www.example.com?q=YF32FF" to indicate that a bandwidth of 5000 Mbs should be applied for the next 30 min and for HTTP traffic related to the URL www.example.com?q=YF32FF.

As indicated by step 902, the CIS traffic processor 36 of the gateway 26 intercepts this HTTP connection and determines parameters from the intercepted message 901, e.g. a selected bandwidth, a selected time, a selected URL, or the like. Other traffic from the UE 10 to the web server 80 may be forwarded to the web server 80.

The parameters as determined by the CIS traffic processor 26 could be locally applied in the gateway 26 to generate new or updated PCC rules. In this way, signaling between the gateway and the PCRF 30 could be reduced.

However, as illustrated in FIG. 9, the CIS traffic processor 36 of the gateway may also communicate the determined parameters to the PCRF 30. This may be accomplished by sending a CCR message 904 to the PCRF 30. As indicated by step 905, the PCRF 30 may then determine new or updated PCC rules on the basis of the received parameters and send these PCC rules to the PCEF 34 of the gateway 26. This may be accomplished by CCA message 906.

As indicated by step 907, the PCC rules are installed in the PCEF 34 of the gateway 26 and will be applied to future traffic from or to the UE 10. For example, the bandwidth for a download could be increased or certain types of traffic, such as mobile gaming, could be blocked as selected by the end user.

Since other fees may be associated with the newly installed PCC rules, the PCEF 34 of the gateway 26 may inform the OCS 44 accordingly. This may be accomplished by sending a CCR message 908 to the OCS 44 and receiving a CCA message 909 from the OCS 44.

As illustrated with exemplary message 910 and indicated by step 911, the newly installed PCC rules are then enforced on the data traffic from or to the UE 10. For example, if the newly installed PCC rules include an increase of bandwidth for a download from the web server 80, represented by message 910, enforcing the PCC rules causes the bandwidth to be increased. For example, a dedicated bearer 54 as explained in connection with FIG. 1 could be assigned to this download and be configured with a corresponding GBR.

Figure 10:
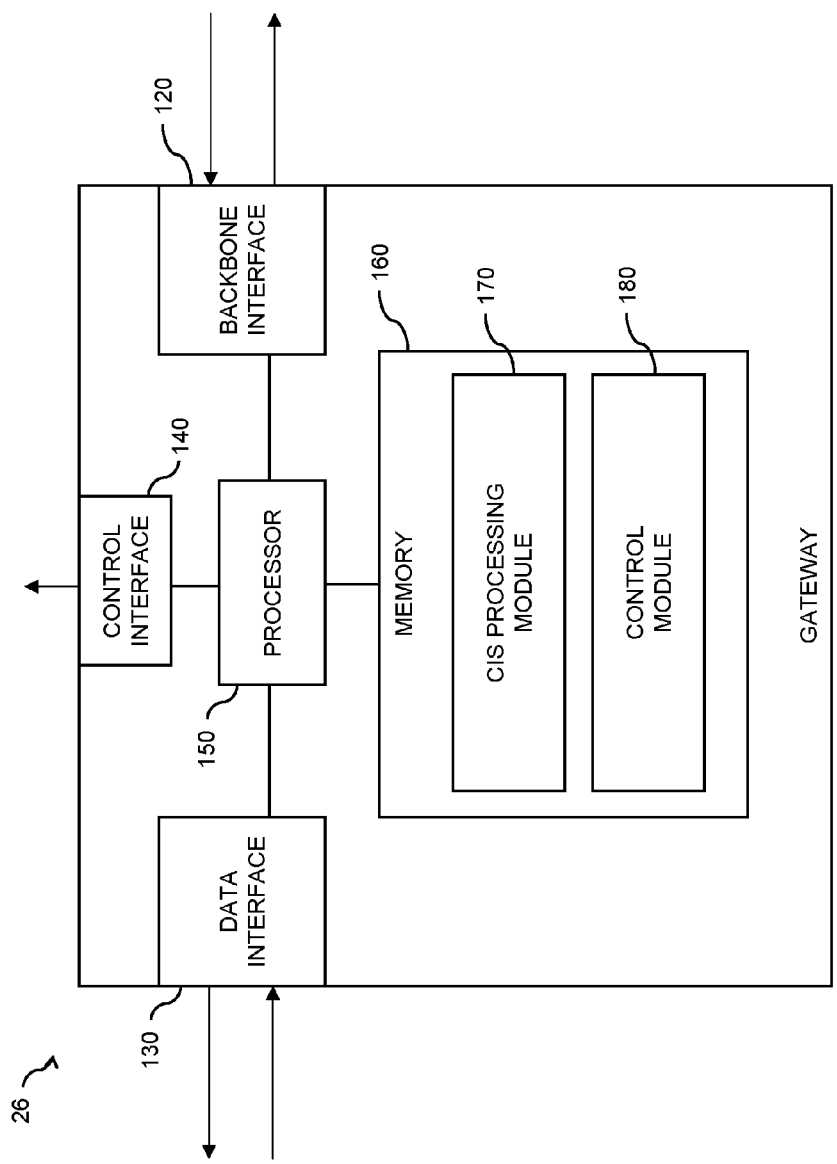
FIG. 10 schematically illustrates a gateway according to an embodiment of the invention.

FIG. 10 further illustrates an exemplary implementation of a gateway. In particular, the gateway may correspond to the gateway 26 as explained above.

In the illustrated example, the gateway 26 includes a backbone interface 120 and a data interface 130. The data interface 130 may be used for establishing a packet data connection to one or more UEs, e.g., to the UE 10 of FIGS. 1, 3, 8, and 9. The backbone interface 120 may be used to communicate data with internet resources, e.g., with web servers such as the web server 80 of FIGS. 3 and 9. In addition, the gateway 26 is also provided with a control interface 140. The control interface 140 may be used for sending and receiving control signaling, e.g., concerning traffic handling rules. In the illustrated 3GPP scenario, the control interface 140 may implement the above-mentioned Gx reference point, e.g., for communication with the PCRF in the processes of FIGS. 8 and 9, Gxx reference point, Gy reference point, e.g., for communication with the OCS in the process of FIGS. 8 and 9, or Gz reference point.

Further, the gateway 26 includes a processor 150 coupled to the interfaces 130, 140 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the gateway 26 in user communication using a CIS. More specifically, the memory 160 may include a CIS processing module 170 so as to implement the above-described functionalities of the CIS traffic processor 36, e.g., modifying data traffic of a UE or extracting information from data traffic of a UE. Further, the memory 160 may also include a control module 180 so as to implement control functionalities of the gateway 26. Among these functionalities there may be functionalities of policy enforcement such as performed by the above described PCEF 34. The control functionalities may also include packet inspection functionalities such as DPI or the like, e.g., for detecting data traffic to be modified.

It is to be understood that the structure as illustrated in FIG. 10 is merely schematic and that the gateway 26 may actually include further components which, for the sake of clarity, have not been illustrated, e.g., further interfaces. Also, it is to be understood that the memory 150 may include further types of program code modules, which have not been illustrated, e.g., program code modules for implementing known functionalities of a gateway, e.g., protocol functionalities or the like. According to some embodiments, also a computer program product may be provided for implementing concepts according to embodiments of the invention, e.g., a medium storing the program code to be stored in the memory 160.

Figure 11:
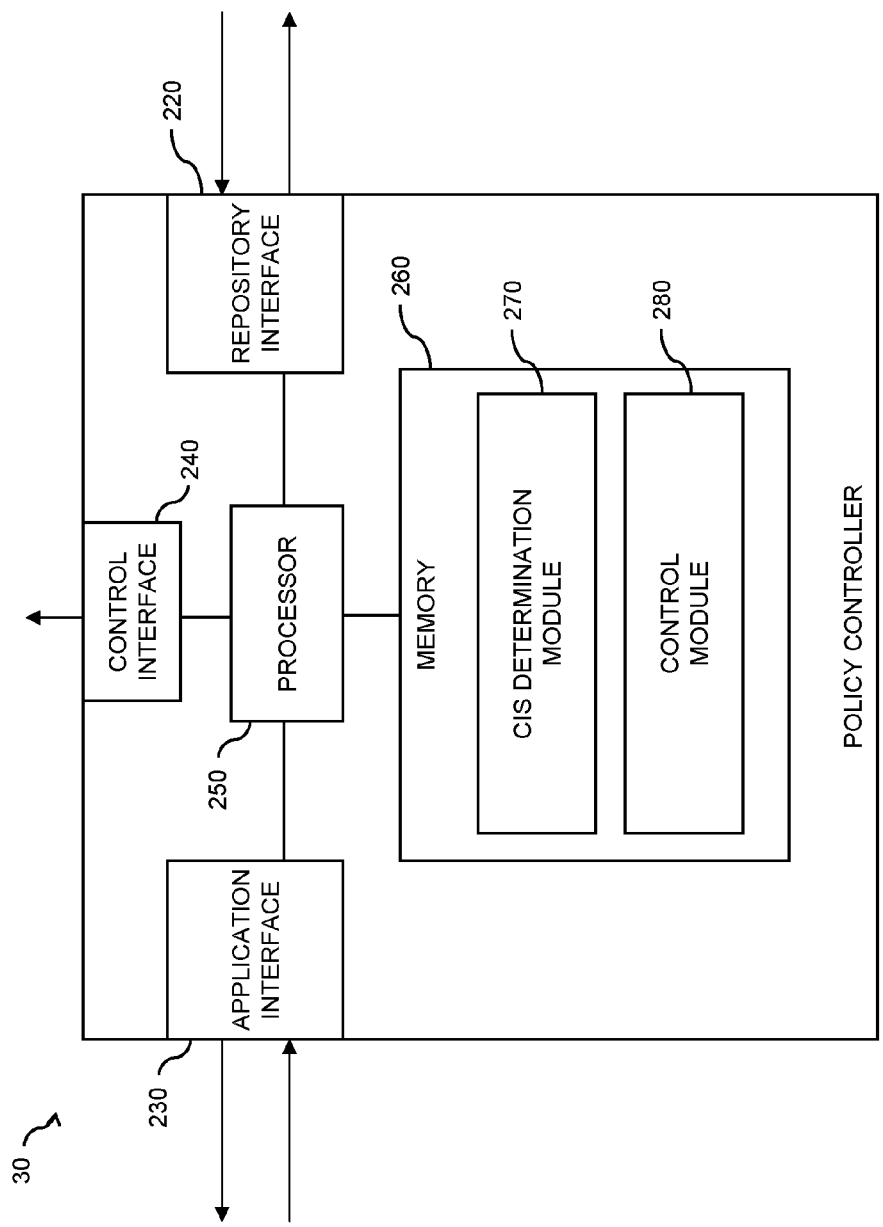
FIG. 11 schematically illustrates a policy controller according to an embodiment of the invention.

FIG. 11 further illustrates an exemplary implementation of a policy controller. The policy controller may correspond to the policy controller 30 as explained in connection with FIGS. 1-3, 8, and 9 and may in particular be implemented as a PCRF as explained in connection with FIGS. 2, 3, 8, and 9.

In the illustrated example, the policy controller 30 includes a repository interface 220, an application interface 230, and a control interface 240. The repository interface 220 may be used for communication with a repository such as the above-mentioned repository 38. In the concepts of user communication on the basis of a CIS as described herein, the repository interface 220 may be used for receiving subscription data from the repository, which may then be used for determining the CIS to be provided to the UE. Further, also data indicating a storage location of the CIS may be obtained via the repository interface 220. In a 3GPP PCC architecture as illustrated in FIG. 2, the repository interface 220 may be implemented as the Sp reference point. The application interface 230 may be used for application level communication, e.g., with an AF 50 as illustrated in FIG. 2. If the policy controller 30 is implemented as a PCRF according to the 3GPP TSs, the application interface 230 may correspond to the Rx reference point. The control interface 240 may be used for sending and receiving control signaling. If the policy controller 30 is implemented as a PCRF according to the 3GPP TSs, the control interface 240 may correspond to the Gx reference point, e.g., for communication with the PCEF 34 or CIS traffic processor 26 in the processes of FIGS. 3, 8 and 9. In some scenarios, the control interface 240 may also implement the Gxx reference point.

Further, the policy controller 30 includes a processor 250 coupled to the interfaces 220, 230, 240 and a memory 260 coupled to the processor 250. The memory 260 may include a read-only memory (ROM), e.g. a flash ROM, a random-access memory (RAM), e.g. a Dynamic RAM (DRAM) or static RAM (SRAM), a mass storage, e.g., a hard disk or solid state disk, or the like. The memory 260 includes suitably configured program code to be executed by the processor 250 so as to implement the above-described functionalities of the policy controller 30 in user communication using a CIS. More specifically, the memory 260 may include a CIS determination module 270 so as to implement the above-described functionalities of the CIS controller 32, e.g., for to determining the CIS to be provided to the UE. As mentioned above, such a determination may be accomplished on the basis of subscription data, which in the illustrated implementation may be received via the repository interface 220 from a repository coupled thereto. Further, the memory 260 may also include a control module 280 so as to implement control functionalities of the policy controller. Among these functionalities there may be functionalities of policy control such as performed by a PCRF according to the 3GPP TSs. In connection with concepts customization of PCC rules as described above, these functionalities may also include the determination of new or updated PCC rules on the basis of parameters or other information as obtained by the CIS.

It is to be understood that the structure as illustrated in FIG. 11 is merely schematic and that the policy controller 30 may actually include further components which, for the sake of clarity, have not been illustrated, e.g., further interfaces. Also, some of the illustrated structures may be omitted. For example, the application interface 230 could be omitted in some embodiments. Also, it is to be understood that the memory 250 may include further types of program code modules, which have not been illustrated, e.g., program code modules for implementing known functionalities of a policy controller, e.g., filter generation or the like. According to some embodiments, also a computer program product may be provided for implementing concepts according to embodiments of the invention, e.g., a medium storing the program code to be stored in the memory 260.

Figure 12:
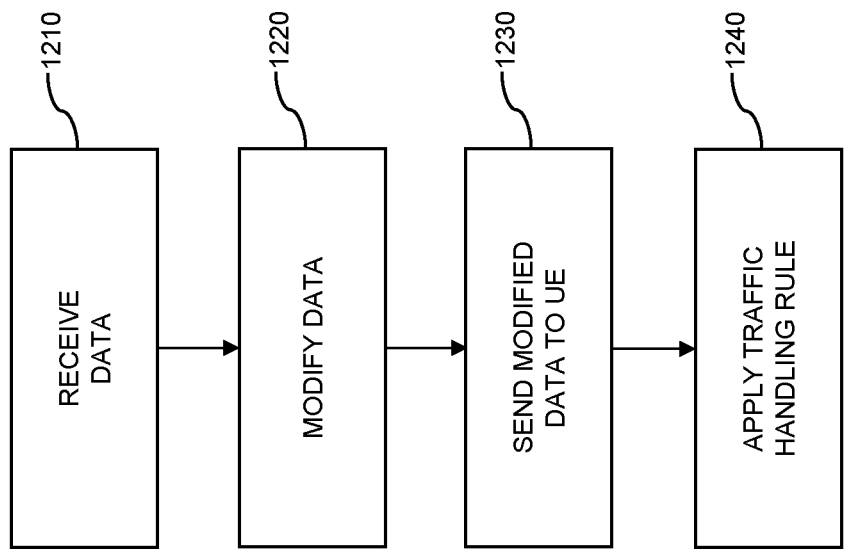
FIG. 12 shows a flowchart for illustrating a method according to an embodiment of the invention.

FIG. 12 shows a flowchart for illustrating a method according to an embodiment of the invention. The method may be used in a mobile network environment as illustrated in FIG. 1 and in particular be implemented in a gateway of the mobile network, which is used for implementing a packet data connection with a UE, e.g., the above-mentioned UE 10. The method may be used to implement parts of the processes as explained in connection with FIGS. 3, 8, and 9. If the mobile network uses a PCC architecture as explained in connection with FIG. 2, the method may be implemented in the gateway 26, using functionalities of the PCEF 34 and of the CIS traffic processor 36.

At step 1210, the gateway receives data destined to a browser application of the UE. The gateway may detect the data by inspecting data packets, e.g., using packet inspection functionalities. For example, the packet inspection functionalities may use DPI, such as in the above-described PCEF 34 of the gateway 26. The gateway may receive the data via a corresponding interface, e.g., the backbone interface 220 of FIG. 10.

At step 1220, the gateway modifies the received data to provide the UE with a CIS to be executed in the browser application of the UE. For example, this may be accomplished by the above-described CIS traffic processor 36. The modification of the data may involve including an identifier of the CIS into the data, e.g., to specify a location from where the CIS can be obtained. For example, such an identifier could be in the form of a URL. Alternatively, the data could also be modified by inserting the CIS itself. The CIS may be configured for implementing a user dialogue, e.g., as explained in connection with FIGS. 3 and 7. However, the CIS could also be configured to merely provide information to an end user of the UE. In some embodiments, the modification may be in HTML code destined to the browser application, e.g., as explained in connection with FIGS. 4 to 6.

At step 1230, the gateway sends the modified data to the UE. This may be accomplished via a corresponding interface of the gateway, e.g., the data interface 130 of FIG. 10. In this way, the browser application of the UE is enabled to execute the CIS. In some embodiments receiving the modified data may directly cause the browser application to execute the CIS. In other embodiments, the CIS can be executed in the browser application in response to some user action, e.g., clicking a button or link. In some embodiments, the browser application obtains the CIS, e.g., from a location indicated in the modified data, before the CIS is executed in the browser application.

Execution of the CIS in the browser application may be used to obtain information concerning a selection by an end user of the UE. This information, e.g., a parameter obtained by the CIS, may be provided by the CIS to the mobile network, where it can be used as a basis for generating one or more new or updated traffic handling rules, such as the above-mentioned PCC rules. In such a scenario, the gateway may install and apply the new or updated traffic handling rules at step 1240. For example, such a new or updated traffic handling rule could define a change in bandwidth to be applied for a certain time. In a 3GPP PCC architecture as explained in connection with FIG. 2, application of the new or updated traffic handling rule may for example be accomplished by a PCEF of the gateway.

Figure 13:
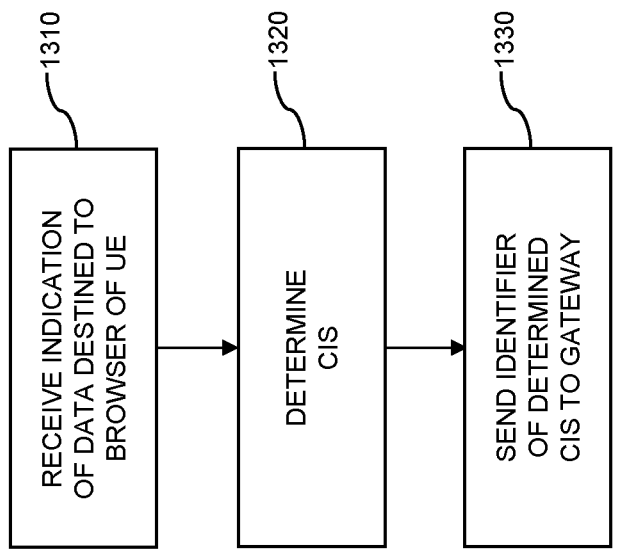
FIG. 13 shows a flowchart for illustrating a further method according to an embodiment of the invention.

FIG. 13 shows a flowchart for illustrating a further method according to an embodiment of the invention. The method may be used in a mobile network environment as illustrated in FIG. 1 and in particular be implemented in a policy controller of the mobile network. The policy controller may in turn control a gateway of the mobile network, which is used for establishing packet data connection with a UE, e.g., the above-mentioned UE 10. The method may be used to implement parts of the processes as explained in connection with FIGS. 3, 8, and 9. If the mobile network uses a PCC architecture as explained in connection with FIG. 2, the method may be implemented in the PCRF 30.

At step 1310, the policy controller receives an indication of data destined to a browser application of the UE. The indication is received from the gateway establishing the packet data connection to the UE. For example, such an indication could be generated by packet inspection functionalities of the gateway, such as the DPI functionalities which may be implemented in the PCEF 34 of the gateway 26 in the PCC architecture of FIG. 2. The indication may be received via a control interface of the policy controller, e.g., the control interface 240 of FIG. 11.

At step 1320, the policy controller determines a CIS to be provided to the UE. For example, the policy controller may determine the CIS on the basis of subscription data related to the UE and received from a subscriber data repository, e.g., the repository 38. In this way, the CIS may be individually determined for different end users.

At step 1330, the policy controller sends an identifier of the determined CIS to the gateway. The identifier may for example specify a location from where the CIS can be obtained, e.g., in the form of a URL. The policy controller may send the identifier via a control interface, e.g., the control interface 240 of FIG. 11. The gateway may then use the identifier to provide the CIS to the UE for execution in the browser application, e.g., by modifying data destined to the browser application of the UE. The CIS may be configured for implementing a user dialogue, e.g., as explained in connection with FIGS. 3 and 7. However, the CIS could also be configured to merely provide information to an end user of the UE. In some embodiments, the modification may be in HTML code destined to the browser application, e.g., as explained in connection with FIGS. 4 to 6.

Execution of the CIS in the browser application may be used to obtain information concerning a selection by an end user of the UE. This information, e.g., a parameter obtained by the CIS, may be provided by the CIS to the mobile network, where it can be used as a basis for generating one or more new or updated traffic handling rules, such as the above-mentioned PCC rules. In such a scenario, the policy controller may receive information obtained by the CIS and generate the new or updated traffic handling rules on the basis of the obtained information. For example, such a new or updated traffic handling rule could define a change in bandwidth to be applied for a certain time. The policy controller may send the new or updated traffic handling rules to the gateway, where they can be applied to data traffic from or to the UE. In a 3GPP PCC architecture as explained in connection with FIG. 2, application of the new or updated traffic handling rule may for example be accomplished by a PCEF of the gateway.

In some embodiments, the policy controller may receive the information obtained by the CIS from the gateway, e.g., as in the process of FIG. 9. Alternatively, the policy controller may receive the information obtained by the CIS from a web server communicating with the UE, e.g., as in the process of FIG. 8.

Figure 14:
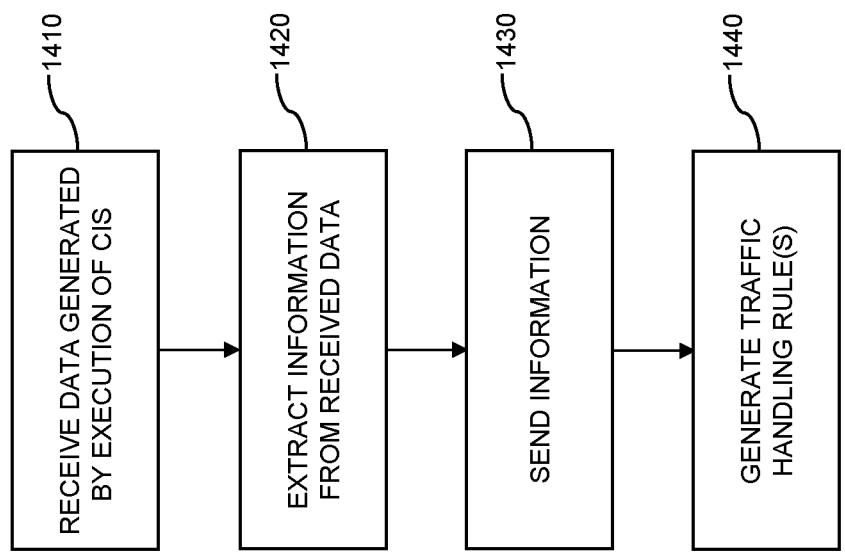
FIG. 14 shows a flowchart for illustrating a still further method according to an embodiment of the invention.

FIG. 14 shows a flowchart for illustrating a further method according to an embodiment of the invention. The method may be used in a mobile network environment as illustrated in FIG. 1. The method can be used to collect information obtained by a CIS in the mobile network and can be implemented in a web server of the mobile network, e.g., the internal web server 60 of FIG. 8, or in a gateway of the mobile network, e.g., the gateway 26, which is used for establishing a packet data connection with a UE, e.g., the above-mentioned UE 10. The method may be used to implement parts of the processes as explained in connection with FIGS. 8 and 9.

At step 1410, data generated by execution of the CIS are received from the UE executing the CIS. In some embodiments, the data may be received by a web server communicating with the UE, e.g., by the internal web server 60 in the process of FIG. 8. For example, the data may be received in a message directed to this web server, e.g., the message 801 of FIG. 8. In other embodiments, the data may be received by the gateway establishing the packet data connection to the UE executing the CIS, e.g., by the gateway 26 in the process of FIG. 9. For example, the data may be received to a message directed to a web server, which is intercepted by the gateway, e.g., as the message 901 in the process of FIG. 9.

At step 1420, information is extracted from the received data. For example, this information may include one or more parameters to be used for generating one or more new or updated traffic handling rules, e.g., a modified bandwidth.

In some embodiments, the extracted information is sent to a further node in step 1430. For example, the information may be sent to a policy controller of the mobile network, e.g., the PCRF 30 in the process of FIG. 8 or 9, where the information can be used for generating new or updated traffic handling rules. This option may in particular be applied if the information is extracted by the web server.

In other embodiments, the extracted information can also be used locally in step 1440 for generating one or more new or updated traffic handling rules. This option may in particular be applied if the information is extracted by the gateway, which also applies traffic handling rules.

It is to be understood that the methods of FIGS. 12 to 14 may be combined to each other as appropriate. For example, the method of FIG. 12 may be used to provide a CIS to the UE, which is determined according to the method of FIG. 13. Further, the method of FIG. 14 may be applied in connection with the method of FIGS. 12 and/or 13 to collect the information obtained by the CIS.

The concepts as explained above can be used as an automatic tool to customize functions in a mobile network, e.g., PCC functions. This allows for a more individual customization than typical commercial packages offered by operators of mobile networks. With concepts according to some of the above embodiments, the end user can select various types of options. This can be done at any time the browser application is used to access a web page. The selection by the end user may be applied instantly to ongoing traffic. For example, the end user can prioritize at any time what traffic is considered to be most important. The end user could select to pay an extra fee to download data using a high bandwidth or select to pay less money to download the same data using a low bandwidth. The end user could also configure what webpages, services, or applications are allowed/forbidden for children to implement parental control. This could also be accomplished in connection with a time schedule defining when these webpages, services, or applications are allowed/forbidden. For an operator of the mobile network, concepts as explained above allow for making a more efficient use of network resources, e.g., by limiting network resources provided for end users having a subscription on the basis of a low price, and giving these end users the possibility to override these limitations if according to individual selections. For example, such users could select to increase a limited bandwidth for a specific file or contents and agree to pay an extra fee for this increase. Further, the concepts as explained above may also be used to interact with operator services. For example, the operator could be advertise an offer or discount through the CIS and the if the end user selects to accept the offer or discount, this could be applied instantly.

It is to be understood that the examples and embodiments as explained above are merely illustrative and susceptible to various modifications. For example, the concepts could be used in other types of mobile network environment than the described 3GPP implementations. Also, the concepts may be applied to various types of interaction between a node in the mobile network and an end user of a UE. Further, it is to be understood that the above concepts may be implemented by using correspondingly designed software to be executed by a processor of an existing device, or by using dedicated device hardware.

What is claimed is:

1. A method to be performed in a mobile network comprising a gateway for establishing a packet data connection with a user equipment, the method comprising:
   the gateway receiving data that is transmitted to a browser application of the user equipment, wherein the gateway receiving data transmitted to the browser application of the user equipment comprises the gateway receiving data traffic that is transmitted from a network resource to the user equipment in response to a request by the user equipment;
   the gateway modifying the received data to provide the user equipment with a client interface script within the received data to be executed in the browser application of the user equipment, wherein the gateway modifying the received data comprises the gateway inserting the client interface script within the received data to be executed in the browser application of the server;
   the gateway sending the modified data to the user equipment, thereby enabling the browser application to execute the client interface script;
   the gateway installing a traffic handling rule for controlling data traffic of the user equipment, said traffic handling rule being generated on the basis of information received from the user equipment that is based on execution of the client interface script at the user equipment; and
   the gateway controlling the data traffic of the user equipment in accordance with the traffic handling rule;
   wherein the traffic handling rule defines at least one of traffic bandwidth for the user equipment, applying parental control for the user equipment, enabling a service or application for the user equipment, disabling a service or application for the user equipment, and/or a time schedule for application of different bandwidths for the user equipment.

2. The method according to claim 1, comprising:
   the gateway receiving information that the user equipment generates by execution of the client interface script.

3. The method according to claim 2, comprising:
   the gateway receiving a response from the user equipment that is transmitted to a web server responsive to the user equipment execution of the client interface script, wherein the web server is separate from the gateway; and
   the gateway extracting the information from the response.

4. The method according to claim 2, comprising:
   the gateway sending the information to a policy controller of the mobile network.

5. The method according to claim 2,
   the gateway receiving the information from a web server communicating with the user equipment.

6. The method according to claim 1, comprising:
   detecting the data that is transmitted to the browser application by inspecting data packets.

7. The method according to claim 1,
   wherein the modified data include an identifier of the client interface script.

8. The method according to claim 1,
   wherein the client interface script is configured for implementing a user dialogue.

9. A method to be performed in a mobile network comprising a gateway for establishing a packet data connection with a user equipment, the method comprising:
   a policy controller of the mobile network receiving, from the gateway, an indication of a data communicated with a browser application of the user equipment,
      wherein the data is transmitted from a network resource to the user equipment in response to a request by the user equipment, and
      wherein the network resource and the user equipment are separate from the policy controller,
   the policy controller determining a client interface script to be provided with the data and executed in the browser application of the user equipment;
   the policy controller sending an identifier of the client interface script to the gateway, wherein the gateway inserts the client interface script within the data based on the identifier thereby enabling the browser application of the user equipment to execute the client interface script;
   the policy controller receiving information that the user equipment generates based on execution of the client interface script at the user equipment;

the policy controller generating, on the basis of the information, a traffic handling rule for controlling data traffic of the user equipment; and the policy controller sending the traffic handling rule to the gateway, wherein the gateway controls the data traffic of the user equipment in accordance with the traffic handling rule, wherein the traffic handling rule defines at least one of traffic bandwidth for the user equipment, applying parental control for the user equipment, enabling a service or application for the user equipment, disabling a service or application for the user equipment, and/or a time schedule for application of different bandwidths for the user equipment.

10. The method according to claim 9, comprising:

the policy controller receiving subscription data related to the user equipment from a subscriber data repository; and the policy controller determining the client interface script on the basis of the received subscription data.

11. The method according to claim 9, wherein the policy controller receives the information from the gateway.

12. The method according to claim 9, wherein the policy controller receives the information from a web server communicating with the user equipment.

13. The method according to claim 9, comprising:

the policy controller sending the traffic handling rule to the gateway.

14. The method according to claim 9, wherein the client interface script is configured for implementing a user dialogue.

15. A gateway to be used in a mobile network for establishing a packet data connection with a user equipment, the gateway comprising:

a first interface with respect to a web server; and
a second interface with respect to the user equipment; and
a processor;
wherein the processor is configured to:
receive, via the first interface, data that is transmitted to a browser application of the user equipment,
modify the received data to provide the user equipment with a client interface script within the received data to be executed in the browser application to the user equipment, wherein the processor is configured to modify the received data by inserting the client interface script within the received data, and
send, via the second interface, the modified data to the user equipment, thereby enabling the browser application of the user equipment to execute the client interface script,
wherein receiving, via the first interface, data that is transmitted to the browser application of the user equipment comprises receiving data traffic that is transmitted from a network resource to the user equipment in response to a request by the user equipment;
wherein the gateway is configured to install a traffic handling rule for controlling data traffic of the user equipment that is generated based on information received from the user equipment that is generated based on execution of the client interface script at the user equipment, and
wherein the gateway is configured to control the data traffic of the user equipment in accordance with the traffic handling rule;

wherein the traffic handling rule defines at least one of traffic bandwidth for the user equipment, applying parental control for the user equipment, enabling a service or application for the user equipment, disabling a service or application for the user equipment, and/or a time schedule for application of different bandwidths for the user equipment.

16. A policy controller to be used in a mobile network comprising a gateway for establishing a packet data connection with a user equipment, the policy controller comprising:

a control interface with respect to the gateway; and
a processor,
wherein the processor is configured to:
receive, via the control interface, an indication of data communicated with a browser application of the user equipment,
wherein the data is transmitted from a network resource to the user equipment in response to a request by the user equipment, and
wherein the network resource and the user equipment are separate from the policy controller, and
determine a client interface script to be provided with the data and executed in the browser application of the user equipment;
send an identifier of the client interface script to the gateway, wherein the gateway inserts the client interface script within the data based on the identifier thereby enabling the browser application of the user equipment to execute the client interface script;
wherein the policy controller is configured to receive information that the user equipment generates based on execution of the client interface script at the user equipment, and generate, on the basis of the information, a traffic handling rule for controlling data traffic of the user equipment, and send the traffic handling rule to the gateway, wherein the gateway controls the data traffic of the user equipment in accordance with the traffic handling rule;
wherein the traffic handling rule defines at least one of traffic bandwidth for the user equipment, applying parental control for the user equipment, enabling a service or application for the user equipment, disabling a service or application for the user equipment, and/or a time schedule for application of different bandwidths for the user equipment.

17. The policy controller according to claim 16, wherein the processor is further configured to send, via the control interface, an identifier of the client interface script to the gateway.

18. The method according to claim 1, wherein the client interface script is implemented by a client-side language to be executed in the browser application of the user equipment.

19. The gateway according to claim 15, wherein the client interface script is implemented by a client-side language to be executed in the browser application of the user equipment.

20. The method of claim 1 wherein the traffic handling rule defines the traffic bandwidth for the user equipment so that the gateway controls a bandwidth of the data traffic of the user equipment in accordance with the bandwidth defined by the traffic handling rule that is generated on the basis of information received from the user equipment that is based on execution of the client interface script at the user equipment.

21. The method of claim 9 wherein the traffic handling rule defines the traffic bandwidth for the user equipment.

22. The gateway of claim 15 wherein the traffic handling rule defines the traffic bandwidth for the user equipment so that the gateway controls a bandwidth of the data traffic of the user equipment in accordance with the bandwidth defined by the traffic handling rule that is generated on the basis of information received from the user equipment that is based on execution of the client interface script at the user equipment.

23. The gateway of claim 16 wherein the traffic handling rule defines the traffic bandwidth for the user equipment.

* * * * *